April 11, 1944.  H. N. BLISS  2,346,145
RECORDER FOR COLLECTIONS
Filed Oct. 24, 1941  4 Sheets-Sheet 4

Inventor
HARVEY N. BLISS
By Lindsey & Robillard
Attorneys

Patented Apr. 11, 1944

2,346,145

UNITED STATES PATENT OFFICE 2,346,145

RECORDER FOR COLLECTIONS

Harvey N. Bliss, Windsor, Conn., assignor to Veeder-Root Incorporated, Hartford, Conn., a corporation of Connecticut Application October 24, 1941, Serial No. 416,316

10 Claims. (Cl. 101—94)

The present invention relates to recording mechanism and more particularly to a system and mechanism particularly adapted for simultaneously recording duplicate records of installment payments, such as the payments made by an insurance policy holder to the collecting agent of the insurance company.

The object of the present invention is to provide an improved system whereby the duplicate records comprise a master or tally sheet constituting an office record and a receipt card constituting a policy holder record. The tally sheet and the receipt card are each provided with indicia, whereby, when properly corelated and the indicia from the receipt card transferred to the tally sheet, the resultant tally sheet record definitely establishes the time when the payment was made and the status of the account—that is, whether the policy holder is in advance, on time, or delinquent in payments. In addition, there is preferably associated with the tally sheet a receipting mechanism carrying indicia whereby, when the receipt card indicia is transferred to the tally sheet, the receipting device indicia will be simultaneously transferred to the receipt card, thus establishing a definite record of payments for the policy holder.

Another object is to provide a recording mechanism within which the tally sheet and receipting means are carried and into which the receipt card is insertable and wherein the means for supporting the tally sheet properly positions it to obtain a proper corelation between the indicia carried thereon and the indicia carried on the receipt card when the latter is inserted within the mechanism.

Another object is to provide means within the recorder and operable from the exterior of the recorder whereby upon the proper insertion of the receipt card a transfer of the indicia as above described will occur and wherein substantially all of the mechanical parts for accomplishing the foregoing consist of sheet metal stampings, thus providing a mechanism which is extremely economical to manufacture, yet of sufficient strength that it will remain efficient in operation despite continuous handling and manipulation thereof.

Other objects will be in part obvious and in part pointed out more in detail hereinafter.

The invention accordingly consists in the features of construction, combination of elements, and arrangement of parts which will be exemplified in the construction hereafter set forth and the scope of the application of which will be indicated in the appended claims.

Figure 8:
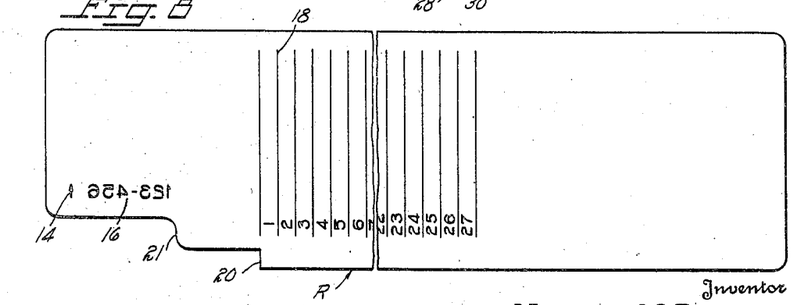
Fig. 8 is a copy of a receipt card used in carrying out the invention herein.
Figure 9:
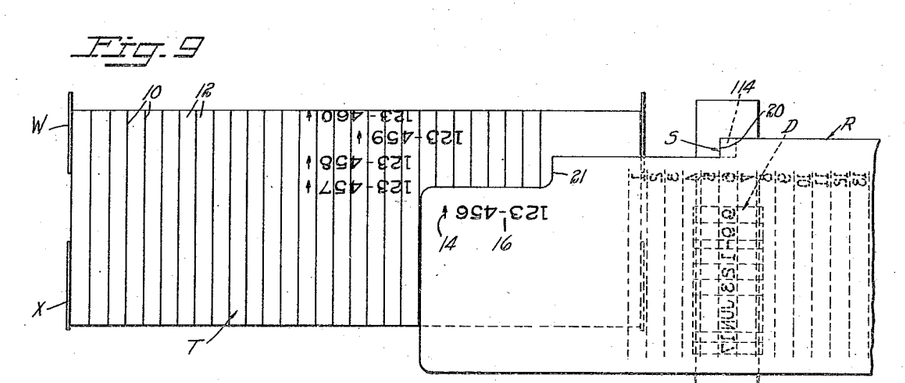
Fig. 9 is a more or less diagrammatic view showing the tally sheet, receipting means, and receipt card in proper relative positions relative to one another for the transfer of indicia.
Figure 10:
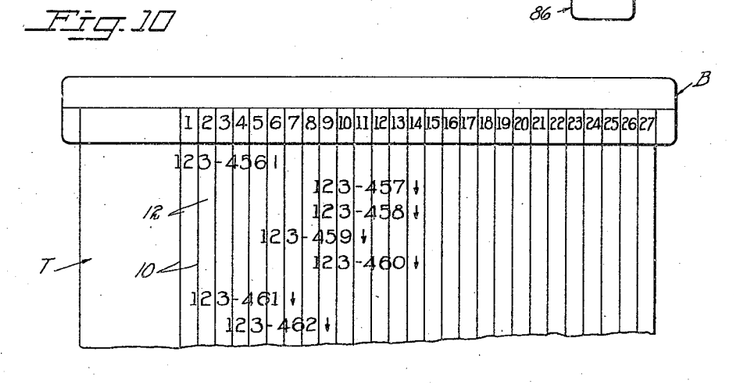
Fig. 10 is a view of the tally sheet for a predetermined collection period.

An understanding of the invention may best be had by reference to Figs. 8 to 10, inclusive, wherein there is shown a tally sheet T and a receipt card R. As best seen in Fig. 10, the tally sheet is subdivided by a plurality of lines 10 into a plurality of columns 12; these columns representing a number of consecutive collection periods in a single bookkeeping period, such as the twenty-six or twenty-seven consecutive weeks in a six months period. At the beginning of each collection period, a new tally sheet T is wound onto a spool X and, from there, drawn to a winding spool W. When positioned on the spools, the columns of the tally sheet are arranged at predetermined fixed distances from a stop S and a receipt device D.

The receipt card R is adapted to cooperate with the tally sheet T, stop S, and receipt device D, and, to accomplish this, it comprises a rectangular sheet of any suitable sort of material, such as highgrade flexible cardboard cut to rectangular shape and of substantially greater length than width. Adjacent its top edge the front face of the tally card is provided with longitudinally arranged indicia consisting of a column-indicating character 14 and a policy or account number 16. Beneath the indicia and extending transversely of the card are a plurality of lines 18 consecutively numbered to correspond to the columns on the tally sheet. In addition, one edge of the receipt card R is further provided with a pre-formed shoulder 20 adapted to cooperate with the stop S and a final positioning shoulder 21 for purposes hereinafter apparent.

At the beginning of any bookkeeping period, a receipt card R is supplied to each policy holder. Upon a collection being made, the card is superimposed face down on the tally sheet T (see Fig. 9) with the stop shoulder 20 abutting the stop S. When so located, the indicating character 14 will be positioned in the tally sheet column corresponding in number to the line on the receipt card which overlies the dating device D. Thereafter the indicia on the receipt card is transferred to the tally sheet and the indicia of the receipting device D is transferred to the receipt card. Upon the transfer of indicia, a portion of the card is cut to form a new stop shoulder 21 in line with the next consecutively numbered line on the receipt card, whereupon when a subsequent payment is made, proper registration of the card and tally sheet will result.

At the completion of a collection period, the tally sheet is again removed from the machine and suspended from any suitable bracket B, whereupon, by inspecting same, a record of payments may immediately be determined. Assuming, for example, that the tally sheet shown is used for the eleventh collection period, the indicating characters in the column "14" will show that these policy holders have made advance payments, that in the column "11" will show that the policy holder is paid to date, whereas all of the others will show that the policy holders are delinquent.

From this it will be seen that the tally sheet provides a permanent office record which permits ready determination of the status of the payments of all of the policy holders and the receipt card keeps the policy holder accurately informed of all payments. At the completion of a bookkeeping period, a new set of receipt cards is distributed, and, to distinguish this period from the previous one, the indicating character on the receipt card may be changed. For example, a star may be substituted for the arrow on the card shown in Fig. 8. If during any bookkeeping period new policy holders are acquired, the receipt card initially supplied will have the stop shoulder 20 pre-formed to align the indicating character 14 in the column corresponding to the first collection period in which a payment is made.

Figure 6:
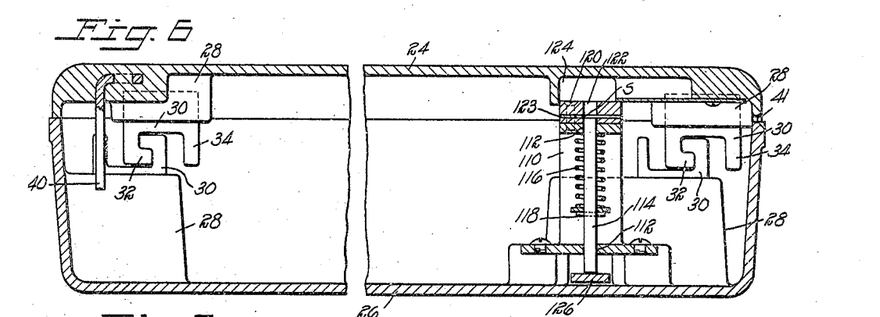
Fig. 6 is a side view with the casing in section and showing the interlocking means for maintaining the casing sections together and the cutting means for forming shoulders on the receipt card.
Figure 7:
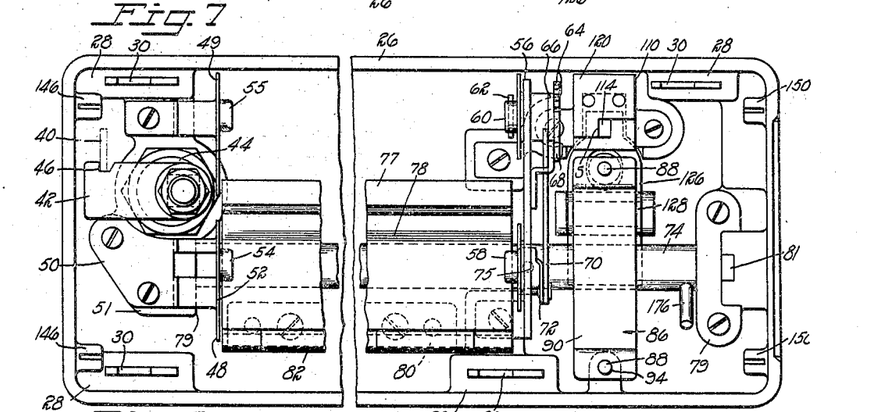
Fig. 7 is a plan view with part of the interior structure removed to more clearly show the means for transferring the indicia from the receipt card to the tally sheet.

The recorder for carrying out the foregoing operation comprises a rectangular casing having a cover member 24 and body member 26. To secure these members together, the cover member 24 is provided with four bosses 28, and depending from each boss is an interlocking element 30 comprising an L shaped hook 32 spaced from a vertical guide 34 (see Figs. 6 and 7). In like manner, the body member is provided with four bosses 28 each supporting an upwardly extending interlocking member 30 of like construction to the cover member. The interlocking members 30 of both casing members are in vertical alignment, but are reversed relative to one another whereby to close the cover member it is vertically lowered into position with the respective L members engaging the respective guide members, and thereafter the cover member is moved longitudinally to position the L members in interlocking engagement. The casing members are positively secured in interlocked position by providing the cover member adjacent the left or rear end wall with a depending locking finger 40 which lies in the path of movement of a locking pawl 42 which is rotatably secured to any suitable tumbler-type lock 44. As best seen in Fig. 7, the pawl 42 is provided with a notch 46 into which the locking finger 40 is received when the lock is moved to locking position, thus positively holding the cover and body member in closed position.

Figure 1:
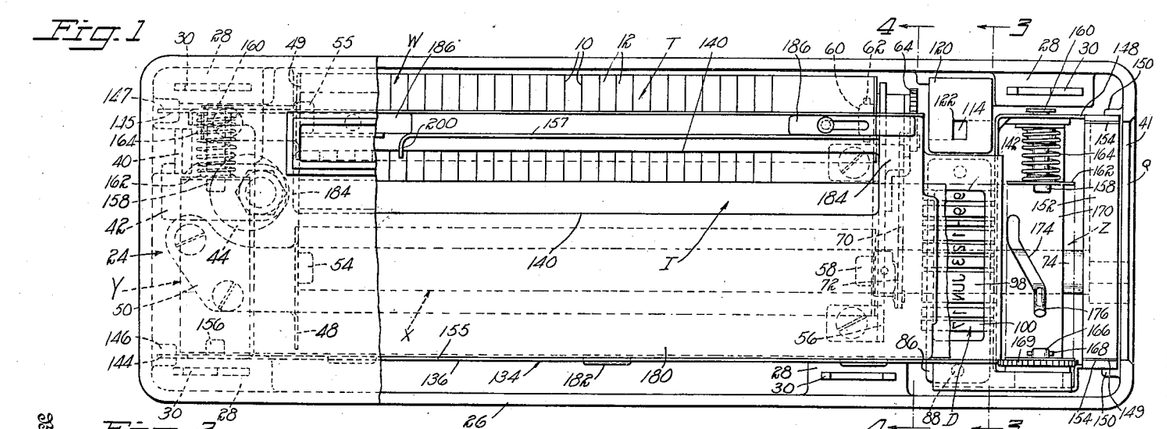
Figure 1 is a plan view of the recording mechanism with the casing partly removed to show the interior construction thereof.
Figure 2:
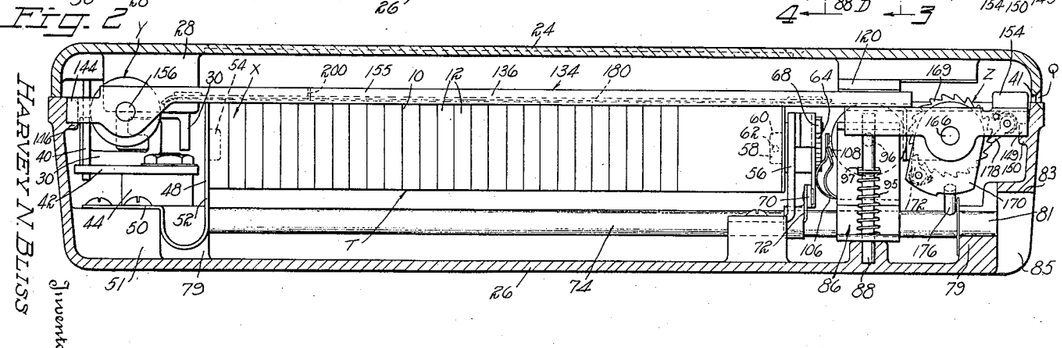
Fig. 2 is a side view with the casing in section to show the interior thereof.
Figure 3:
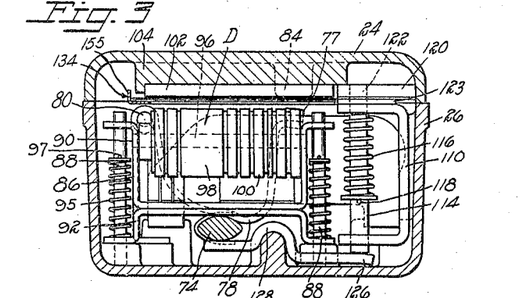
Fig. 3 is a view taken generally on the line 3—3 of Fig. 1.

Referring now to the interior mechanism, there is disposed forwardly of the lock 40 a pair of transversely spaced members 48 and 49, each of which serves as a support for an end of the respective tally sheet spools X and W (see Figs. 1, 2, and 7). Each member 48 is preferably made of spring metal having a horizontal leg 50 secured to a boss 51 on the base of the body member and a vertical leg 52 connected to the horizontal leg by a U bend to permit ready flexing of the members. The inner face of the vertical leg of the member 48 is provided with a spool-holding pivot 54 and the inner face of the vertical leg of the member 49 with a corresponding pivot 55.

To support the forward ends of the tally sheet spools there is spaced forwardly of members 48 a bracket 56 secured to the bottom wall of the body member 26 and extending vertically therefrom. Arranged in this bracket and in alignment with the pivot 54 is a pivot 58 and in alignment with the pivot 55 is a pivot 60.

With the foregoing arrangement, it will be seen that the tally sheet spools W and X, which may be of any usual construction, such, for example, as those commonly used for the winding of camera film, may be readily inserted onto the supports by flexing the members 48 to increase the distance between the pivots, placing the spools in alignment with the pivots, and then permitting the members 48 to flex back into holding position. To advance the tally sheet T after each recording operation, the pivot 60 is provided with radial projections 62 adapted to fit into corresponding notches in the end of the spool, whereby upon rotation of the pivot the spool will be rotated.

The rotation of pivot 60 is accomplished by rotatably mounting it in bracket 56 and securing to its forwardly extending end a drive ratchet 64. The ratchet 64 is driven by a lever 66 rotatably mounted on the pivot intermediate of the ratchet and the bracket 56; the lever 66 being operatively connected to the ratchet by a pawl 68 normally spring pressed into engagement behind one of the ratchet teeth. To rotate the lever 66, the latter is pivotally connected to one end of a link 70, which link has its opposite end pivotally connected to a second link 72. The other end of the link 72 is provided with bifurcated oval-shaped fingers adapted to straddle an oval-shaped actuating lever 74; the fingers being secured to the lever by a pin 75 extending therethrough. The lever 74 extends longitudinally of the casing and is pivoted at its opposite ends in front and rear bosses 79 extending vertically from the base of the casing.

For convenience in manufacture, the lever is made oval shaped to provide portions of different radii, whereby upon rotation of the lever a camming action results for causing operation of the link 72 as well as other means subsequently described. The lever is normally positioned with its major axis transverse of the casing, and is limited in its rotation through 90° in a clockwise direction, as viewed in Fig. 4. Its rotation is limited by providing the forward end of the lever with a reduced portion 81 which projects into a recess 83 provided in the forward end wall of the casing. Secured to the projecting end is an operating member or lever 85 having an upper flat surface 87 adapted to abut a corresponding flat surface 89 in the recess when the lever 74 is in its normal or inoperative position. With this arrangement, the lever 85 can only be rotated in a clockwise direction from its inoperative position through 90°, whereupon it will be stopped by abutting the left side wall of the casing (see Fig. 5). For convenience in operation, the upper face of the lever 85 may also have cut therein a semi-circular portion 91 underlying a corresponding semi-circular portion 93 of the recess.

With the lever so mounted, upon being rotated to perform a recording operation the links 72 and 70 will be operated to pivot the lever 66 in a counterclockwise direction, carrying the pawl 68 into engagement with the next successive ratchet tooth. Upon return of the lever 74 to inoperative position, the ratchet 64 will be advanced one tooth to rotate pivot 60 and advance the winding spool W one step and likewise advance the tally sheet one step. To prevent rotation of the ratchet 64 in a non-driving direction, there is also associated therewith a non-back-up pawl 76 pivotally mounted on the bracket 56 and spring pressed into engagement with the ratchet.

Figure 4:
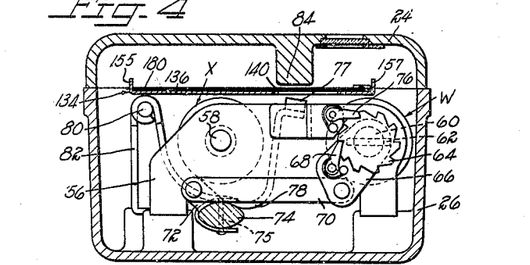
Fig. 4 is a view taken generally on the line 4—4 of Fig. 1.
Figure 5:
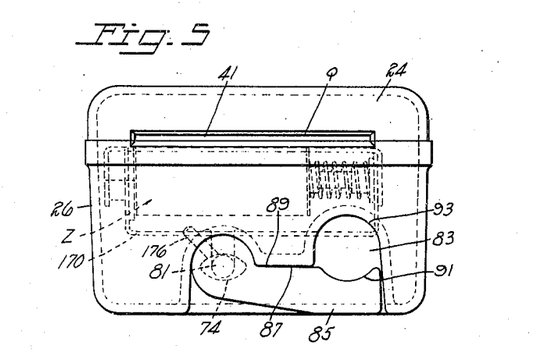
Fig. 5 is an end view looking at the forward end of the casing.

Associated with the tally sheet T and positioned within the casing to cooperate therewith are recording means for applying pressure to transfer the indicia from the receipt card R onto the tally sheet T. These means comprise a pair of cooperating printing elements, one element being a hard rubber platen 77 extending longitudinally of the casing and supported on the upper end of a substantially U-shaped lever 78 (see Figs. 4 and 7); the end of the opposite leg of the lever being mounted on a pin 80. The pin 80 is supported by a bracket 82 extending vertically from and secured to the base plate of the casing. As best seen in Fig. 4, the U-shaped member 78 overlies the actuating lever 74, whereby upon actuation of the latter the platen will be raised towards engagement with the second cooperating element, namely, a pressure plate 84 which may be formed by providing a rectangular boss depending from the cover plate 24, and when the receipt card is positioned therebetween, the resulting pressure will transfer an imprint of the card indicia onto the tally sheet.

To properly cooperate with the tally sheet, the receipting mechanism comprises a second pair of cooperating printing elements arranged at right angles to said first printing elements and disposed within the casing forwardly of the bracket 56. One printing element of the receipting mechanism comprises an indicia supporting carriage 86 slidably mounted on a pair of transversely spaced, circular guideposts 88, which guideposts are secured to and extend vertically from the base plate of the casing. The carriage consists of an upper U-shaped member 90 and a lower U-shaped member 92, which is inverted relative to the first member, and the two secured together by welding or otherwise joining the base members of the U. To slidably mount the carriage, the respective legs of the U-shaped members are turned laterally and are provided with suitable openings 94 slidably mounting them on the circular guidepost 88.

The member 90 of the frame 86 further carries a transversely arranged shaft 96 upon which there is rotatably mounted dating mechanism including a month-indicating wheel 98 and a plurality of numeral wheels 100. These wheels have raised indicia on their periphery whereby when brought into contact with the receipt card the indicia will be transferred to the receipt card.

The carriage 86 is normally urged downwardly into resting engagement on the actuating lever 74 by a spiral spring 95 located on one of the posts 88 and positioned between one of the extending legs of the lower frame member 92 and a pin 97 positioned adjacent the opposite extending leg of the upper frame member 90. With the carriage 86 normally in its lowermost position it will be seen that upon rotation of the lever 94 the carriage and indicia will be raised towards engagement with the second cooperating printing element—namely, a transversely arranged, hard rubber rectangular platen supported on a boss 104 extending from the cover member.

In order to hold the numeral and month wheels in fixed position, there are provided a plurality of spring fingers 106 (see Fig. 2) having their lower ends fixed to the crosspiece of the frame 86 and their upper ends carrying frictional means 108 engaging the periphery of the respective wheels.

Also arranged in substantially transverse alignment with the receipt means D is a cutting means for pre-forming a new stop shoulder upon the receipt card following each recording operation. These means include a U-shaped member 110 having one leg secured to a pair of bosses extending vertically from the base of the casing (see Fig. 6). The legs of the member 110 are further provided with aligned non-circular openings 112 in which there is slidably mounted a rectangular cutting punch 114. The punch is normally maintained in its lowermost position by a spring 116 positioned on the punch intermediate of the top leg of the member 110 and a pin 118 carried on the punch.

Also carried by the top leg of the member 110 is a die 120 having a rectangular opening 122 arranged in alignment with the punch 114. The die is spaced from the leg by a filler-piece 123 which lies rearwardly of the punch and also functions as the stop shoulder S against which the pre-formed shoulder of the receipt card abuts upon insertion into the mechanism.

In order to actuate the cutting punch 114, the lower end rests on one end of a transversely arranged lever 126; the opposite end of the lever underlying the actuating lever 74. Intermediate of its ends lever 126 has a U-shaped portion 128 which overlies a half round boss extending vertically from the base of the casing. In this way, upon operation of lever 74 to perform a recording operation, lever 126 will be pivoted to raise the punch 114 and cut out the portion of the card overlying the upper end thereof, thereby pre-forming a new shoulder. The resultant cuttings are pushed through the die 120 and into a rectangular recess 124 formed in the cover member where they will be retained until the cover is removed.

There is further arranged within the casing a removable carrier 134 which supports an inking ribbon I, which ribbon overlies the tally sheet T and receipting means D. More specifically, the carrier 134 includes a base plate 136 of such size that it overlies the tally sheet and dating mechanism, and, to permit the transfer of indicia, the plate has cut therein a longitudinally extending rectangular opening 140 in alignment with the tally sheet platen 77 and a transverse rectangular opening 142 in alignment with the dating indicia of the receipting means D.

The plate 134 is supported at its inner end by a pair of arms 144 and 145 extending from the plate corners and having their ends resting on bosses 146 extending forwardly from the rear end wall of the casing body member 22. In like manner, the forward corners of the plate are provided with forwardly extending arms 148 and 149 having their ends resting on bosses 150 extending inwardly from the forward end walls of the body member of the casing. The forward ends of the arms 148, 149 are further interconnected with a transversely arranged member 152 lying in the same plane as the base plate 134.

As best seen in Fig. 2, the bosses position the carrier so that the member 152 and plate 136 lie in substantial alignment with the wall opening 41 whereby upon insertion of the card it will be supported by the carrier. To guide the card when inserted within the carrier, the member 152 is provided with upturned guide edges 154 spaced to correspond to the width of the card beneath the pre-formed shoulders, and the plate 134 is provided with upturned guide edges 155 and 157 to correspond to the width of the card forwardly of the pre-formed shoulders.

The carrier 134, in addition to supporting the inking ribbon, also supports inking ribbon spools Y and Z which, like the spools for the tally sheet, may be of usual construction. In order to support these spools, the rearwardly extending carrier arm 144 is provided with a pivot 156 and the opposite arm 147 with a pivot 158. To permit the ready insertion of the ribbon-carrying spool, the pivot 158 is provided at its outer end with an enlarged head 160 and adjacent its inner end with a collar 162. Intermediate of the collar 162 and the supporting arm 147 is a spring 164 which normally maintains the pivot 158 in its innermost position, but allows it to be drawn laterally by grasping the head 160 to pull the pin laterally against the tension of the spring 164, whereby the spool may be readily inserted. In like manner, there is carried on the forward supporting arm 148 a pivot 159 corresponding in structure to that carried on the arm 147. Disposed oppositely to this pivot 159 and carried by the supporting arm 149 is a movable pivot 166 having radial projections 168 adapted to be received in corresponding grooves in the end of the ribbon spool, whereby pivot 166 is rotated and the inking spool is drawn from spool Y and wound onto spool Z.

In order to rotate pivot 166, the latter is rotatably carried in the arm 149 and has secured thereto a drive ratchet 169. To operate the ratchet 169 there is also rotatably mounted on the oppositely disposed pivots 166 and 158 a U-shaped bail 170 which carries on the leg adjacent the ratchet 169 a pawl 172 which is normally spring pressed into engagement with the ratchet teeth, whereby upon rotation of the bail in a counterclockwise direction (as viewed in Fig. 2) the pawl will be drawn down and into engagement with the next succeeding tooth and, upon clockwise rotation, will advance the ratchet and the spool to wind the ribbon.

To actuate the bail, the base member of the latter is provided with a follower slot 174 into which there projects a pin 176, which pin extends from and is rigid with the actuating shaft 74. The follower slot 174 is so cut that upon operation of the actuating lever to provide a recording operation the bail 170 will be initially rotated to draw the driving pawl beneath the next succeeding tooth, and, upon return of the actuating lever to normal position, the ratchet will be driven to wind the ribbon. In order to prevent reverse rotation of the ratchet, there is also provided a non-back-up pawl 178 pivotally mounted on the supporting arm 149 and normally spring pressed into engagement with the ratchet teeth.

To maintain the ribbon I flat as it is drawn from one spool to the other, there is also provided a plate member 180 which overlies the base 136 of the tray 134. The plate 180 is substantially rectangular, being provided on one edge with laterally projecting ears 182 adapted to project through slots in the side wall of the tray and is provided at its other edge with laterally extending arms 184 adapted to overlie the base 136 to either end of the longitudinal opening 140. The plate is maintained in position by a pair of spring clips 186, each of which is slidably mounted on the base 136 for movement into and out of overlying position relative to the plate 180.

With the recorder constructed in the manner described, it will be seen that upon the insertion of the receipt card R through the slot Q it will move forwardly until the stop shoulder engages the stop or fillerpiece 123. When this occurs, one of the consecutively numbered lines of the receipt card will overlie the dating indicia and the indicating character 14 will overlie a correspondingly numbered column. Thereafter the actuating shaft 74 will be rotated in a clockwise direction, looking from the front of the mechanism. When so actuated, it will simultaneously raise the platen 77, the dating device frame 86, and the cutting punch 114, whereby the indicia on the receipt card will be transferred to the tally sheet, the dating indicia transferred to the receipt card, and a new shoulder formed on the receipt card.

Simultaneously with the foregoing operation, the lever 66 and the bail 170 will be rotated to draw the driving pawl associated therewith into engagement with the next successive teeth of the drive ratchets for the tally roll spool and the ribbon spool. Upon rotation of the actuating lever back to normal position, the platen, dating indicia, and cutting punch will lower and the ribbon spool and tally winding spool advance one step. Upon this advance of the tally roll, the recorder data will be drawn from under the pressure plate 84 to a position where it may be seen through a window 188, thus giving the collector a positive indication that the device is properly recording.

In order to prevent more operations on the receipt card than the number of consecutively numbered spaces provided thereon, the guiding edge 157 may be cut and turned inwardly to provide a stop 200 against which the final positioning shoulder 21 of the receipt card will abut when the last consecutively numbered line overlies the dating indicia.

From the foregoing description it will also be seen that the recorder is so made as to permit ready and convenient changing of the various parts. As is evident, when the cover 24 is removed, the carrier 134 may be lifted bodily from the device and thereafter the plate 180 may be lifted from the tray to permit ready changing of the ribbon. With the tray 134 removed, the tally rolls may be readily replaced and the dating mechanism readily changed to the date of the start of the next collection period.

It is likewise evident that with the exception of the casing, lock, actuating lever, the punch, dating guide rods, and springs, the remainder of the interior mechanism may be readily stamped from sheet metal parts, thus greatly reducing the cost of production, although providing a mechanism which is extremely rugged in construction.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a recorder for making a double record at preselected corresponding positions, one on a longitudinally columned tally sheet and the other on a receipt card having printing indicia extending longitudinally inward from its leading edge, transversely extending receipting positions spaced from the indicia and correspondingly numbered to the tally sheet columns, and a preformed stop shoulder in one edge thereof; the combination of a casing having an opening for the insertion of a receipt card, means for supporting a tally sheet in the casing with the columns of the tally sheet extending transversely of the casing, means for advancing the tally sheet one step transversely of the casing after each recording operation, receipting type indicia fixed against longitudinal movement of and transversely arranged in the casing intermediate of the tally sheet supporting means and card insertion opening, cutting means stationarily mounted in said casing for preforming a new stop shoulder on the receipt card upon each recording operation, stop means fixed against movement in the casing for engaging the stop shoulder of an inserted card to limit the insertion thereof and position the leading character of the card printing indicia in a tally sheet column when the like numbered card receipting position overlies the receipting type indicia, and means for transferring an imprint of the printing indicia of an inserted receipt card to a supported tally sheet and an imprint of the receipting indicia to an inserted receipt card.

2. In a recorder for making a double record at preselected corresponding positions, one on a longitudinally columned tally sheet and the other on a receipt card having printing indicia extending longitudinally inward from its leading edge, transversely extending receipting positions spaced from the indicia and correspondingly numbered to the tally sheet columns, and a preformed stop shoulder in one edge thereof; the combination of a casing having an opening for the insertion of a receipt card therein, means for supporting a tally sheet in the casing with the columns of the tally sheet extending transversely of the casing, means for advancing the tally sheet one step transversely of the casing after each recording operation, receipting type indicia fixed against movement longitudinally of and transversely arranged in the casing intermediate of the tally sheet supporting means and card insertion opening, a ribbon carrier overlying said tally sheet supporting means and receipting means indicia and arranged in the plane of said card insertion opening, cutting means stationarily mounted in the casing for preforming a new stop shoulder on the receipt card upon each recording operation, fixed stop means in the casing for engaging the stop shoulder of an inserted card to limit the insertion thereof and to position the leading character of the card printing indicia in a tally sheet column when the like numbered card receipting position overlies the receipting type indicia, and means for transferring an imprint of the printing indicia of an inserted receipt card to a supported tally sheet and an imprint of the receipting indicia to an inserted receipt card.

3. In a recorder for making a double record at preselected corresponding positions, one on a longitudinally columned tally sheet and the other on a receipt card having printing indicia extending longitudinally inward from its leading edge, transversely extending receipting positions spaced from the indicia and correspondingly numbered to the tally sheet columns, and a preformed stop shoulder in one edge thereof; the combination of a casing having an opening for the insertion of a receipt card, means for supporting a tally sheet in the casing with the columns of the tally sheet extending transversely of the casing, means associated with said tally sheet supporting means for winding a tally sheet supported thereon, receipting type indicia fixed against movement longitudinally of and transversely arranged in the casing intermediate of the tally sheet supporting means and card insertion opening, a ribbon carrier overlying said tally sheet supporting means and said receipting means, means associated with said carrier for winding a ribbon supported thereon, cutting means stationarily mounted in said casing for preforming a new stop shoulder on the receipt card upon each recording operation, fixed stop means in the casing for engaging the stop shoulder of an inserted card to limit the insertion thereof to position the leading character of the card printing indicia on the card in a tally sheet column when the like numbered card receipting position overlies the receipting type indicia, and means for transferring an imprint of the printing indicia of an inserted receipt card to a supported tally sheet and an imprint of the receipting indicia to an inserted receipt card and for operating both said winding means.

4. In a recorder of the character described, a rectangular casing having an opening in one end wall thereof for the insertion of a receipt card, a pair of pivots longitudinally spaced adjacent one side wall of the casing for supporting a tally sheet spool, a second pair of pivots longitudinally spaced adjacent the opposite side wall of the casing for supporting a second tally sheet spool whereby a tally sheet supported by said spools will be arranged transversely of the casing, means for rotating one of said tally sheet spool supporting pivots, recording means including a vertically movable member positioned for cooperation with the tally sheet supported on said spools, receipting means stationarily mounted in said casing and including a vertically movable member positioned transversely of the casing intermediate of the tally sheet supporting pivots and said card insertion opening, a carrier overlying said tally sheet supporting pivots and the movable members of said recording and receipting means, a pair of transversely spaced pivots provided at each end of said carrier for supporting ribbon carrying spools whereby said ribbon will extend longitudinally of the casing, means for rotating one of said ribbon spool supporting pivots, and actuating means adapted when moved from normal position to operate the movable members of said recording and receipting means and when returned to normal position to operate the rotatable pivots of said tally sheet and ribbon spool supports.

5. In a recorder of the character described, a casing including a body section, a longitudinally extending platen mounted for vertical movement in the body section, tally sheet spool supporting means disposed to either side of said platen for supporting a tally sheet extending transversely of the casing above said platen, receipting means stationarily mounted in said body section and having a transversely arranged and vertically movable member located to one side of said tally sheet, a ribbon spool carrier overlying said tally sheet spool supporting means, platen, and receipting means, said carrier being freely supported in said body section whereby it may be removed to expose the underlying parts, a cover member for overlying said carrier and closing said body section, said cover member being provided with a longitudinally extending pressure plate and a transversely extending platen, and means for positioning said cover member on said body section to dispose said longitudinally extending pressure plate over the longitudinally extending platen and said transversely extending platen over said receipting means.

6. In a recorder of the character described, a casing including a body section, tally sheet spool supporting means longitudinally disposed in said body section to support a tally sheet extending transversely of the casing, recording means including a vertically movable member and a fixed member, said movable member being disposed between said tally sheet supporting means and extending longitudinally of the casing, receipting means stationarily mounted in said body section and including a vertically movable member and a stationary member, said movable member being disposed transversely of the casing intermediate of the tally sheet and one end wall of the body section, a ribbon spool carrier overlying said tally sheet spool supporting means and said movable members, said carrier being loosely supported in said body section whereby it may be removed to expose the underlying parts, and a cover member overlying said carrier and closing said body section and supporting the fixed members of said recording means and receipting means.

7. In a recorder of the character described, a casing including a body section, tally sheet spool supporting means extending longitudinally within the body section for supporting a tally sheet extending transversely of the casing, a longitudinal platen movably mounted in the body section to underlie a tally sheet supported on said supporting means, a type indicia carrier disposed in said body section intermediate of said tally sheet supporting means and one end of the casing, said carrier being mounted for vertical movement and against movement longitudinally of the casing, a ribbon spool carrier overlying said tally sheet supporting means, platen, and indicia carrier, said ribbon carrier being loosely supported in said body section whereby it may be removed to expose the underlying parts, a cover member overlying said carrier and closing said body section, said cover being provided with a stationary pressure plate and a stationary platen, and means for positioning said cover to dispose said stationary pressure plate over said movable platen and said stationary platen over said type indicia carrier.

8. In a recorder of the character described, a rectangular casing provided with a card insertion opening in one end wall thereof, means within the casing for removably supporting a pair of transversely spaced, longitudinally extending tally sheet supporting spools whereby a tally sheet supported thereon will extend transversely of the casing, recording means including a vertically movable member cooperating with the tally sheet supported on said spools, receipting means stationarily mounted in said casing and including a vertically movable member positioned intermediate of said tally sheet spool supporting means and said card insertion opening for cooperating with a card inserted within said casing, a carrier overlying said tally sheet spool supporting means and the movable members of said recording and receipting means, means on the opposite ends of said carrier for removably supporting ribbon supporting spools, whereby a ribbon supported thereon will extend longitudinally of the casing, means associated with said tally sheet spool supporting means for rotating a spool secured thereon, means associated with said ribbin spool supporting means for rotating a ribbon spool supported thereon, a common actuating member, and an operative connection between each of said recording and receipting movable members and said spool rotating means whereby when said actuating member is moved from normal position it will operate said recording and receipting movable members and, when returned to normal position, will operate said rotating means.

9. In a recorder of the character described, a casing including a rectangular body section, means within the casing for removably supporting a pair of transversely spaced, longitudinally extending tally sheets supporting spools whereby a tally sheet supported thereon will extend transversely of the body section, a longitudinally extending platen movably mounted in the body section and normally positioned beneath the plane of the tally sheet supported on said spool, a type carrier transversely arranged in said body section intermediate of the tally sheet supporting means and one end wall, said type carrier being supported in said body section for vertical movement only, a ribbon carrier overlying said tally sheet spool supporting means, platen, and type carrier, said ribbon carrier being freely supported in said body section whereby it may be removed to expose the underlying parts, means on said ribbon carrier for removably supporting inking ribbon supporting spools at the opposite ends thereof, a cover member for overlying said ribbon carrier and closing said body section, said cover member being provided with a longitudinally extending pressure plate and a transversely extending platen, and means for positioning said cover on said body section to dispose said longitudinally extending pressure plate over the longitudinally extending platen and said transversely extending platen over said receipting means.

10. In a recorder of the character described, a casing having an opening for the insertion of a receipt card, means for supporting a tally sheet in the casing for movement transversely thereof, means for advancing the tally sheet one step transversely of the casing after each recording operation, recording means mounted in the casing and including a movable platen for transferring indicia on a receipt card to the tally sheet, stationarily mounted receipting means in the casing and having type indicia transversely arranged therein intermediate of the tally sheet supporting means and the card insertion opening, said type indicia being mounted for vertical movement, cutting means stationarily mounted in said casing adjacent said receipting means for preforming a new stop shoulder on the receipt card upon each recording operation, fixed stop means in said casing adjacent said cutting means for engaging the stop shoulder of an inserted card, and operating means for vertically moving said first vertically movable member and said indicia and said cutting means and thereafter operating said tally advancing means.

HARVEY N. BLISS.